(12) United States Patent
Moffat et al.

(10) Patent No.: US 7,249,260 B2
(45) Date of Patent: Jul. 24, 2007

(54) METHOD AND APPARATUS FOR IMPLEMENTING A PLUGGABLE PASSWORD OBSCURING MECHANISM

(75) Inventors: Darren J. Moffat, Campbell, CA (US); Casper H. Dik, Amsterdam (NL); Alec Muffett, Hampshire (GB)

(73) Assignee: SUN Microsystems, Inc., Santa Clara, CA (US)

( * ) Notice: Subject to any disclaimer, the term of this patent is extended or adjusted under 35 U.S.C. 154(b) by 710 days.

(21) Appl. No.: 10/461,749

(22) Filed: Jun. 12, 2003

(65) Prior Publication Data

US 2005/0005173 A1    Jan. 6, 2005

(51) Int. Cl.
*H04L 9/00* (2006.01)

(52) U.S. Cl. ............... 713/183; 713/184; 713/185; 713/186; 726/5

(58) Field of Classification Search ............ 713/182, 713/183, 184, 186, 185; 726/5
See application file for complete search history.

(56) References Cited

U.S. PATENT DOCUMENTS

| | | | | |
|---|---|---|---|---|
| 6,088,452 A | * | 7/2000 | Johnson et al. | 380/28 |
| 6,983,377 B1 | * | 1/2006 | Beesley et al. | 726/12 |
| 2001/0054155 A1 | * | 12/2001 | Hagan et al. | 713/193 |
| 2004/0044896 A1 | * | 3/2004 | Kelley et al. | 713/183 |

* cited by examiner

*Primary Examiner*—Gilberto Barron
*Assistant Examiner*—Samson Lemma
(74) *Attorney, Agent, or Firm*—Park Vaughan & Fleming, LLP

(57) ABSTRACT

One embodiment of the present invention provides a system that implements a pluggable password obscuring mechanism. During operation, the system receives a request to obscure a password to produce an obscured version of the password. If the request specifies a customized technique for obscuring the password, the system loads a dynamic library that performs the customized technique, and then uses the dynamic library to obscure the password. If the request does not specify a customized technique, the system uses a default technique to obscure the password. In this way, the customized technique for obscuring the password can be used without having to modify source code.

24 Claims, 4 Drawing Sheets

METHOD AND APPARATUS FOR IMPLEMENTING A PLUGGABLE PASSWORD OBSCURING MECHANISM

BACKGROUND

1. Field of the Invention

The present invention relates mechanisms for providing security in computer systems. More specifically, the present invention relates to a method and an apparatus for implementing a pluggable password obscuring mechanism that can be reconfigured to use different obscuring techniques without having to modify source code.

2. Related Art

A computer system typically requires a user to provide a user name and a password for authentication purposes before allowing the user to access a specific account or application. The computer system verifies that the password is correct by performing a lookup based on the username in a password store that is accessible by the computer system. For security purposes, this password store is typically encrypted or otherwise obscured so that an eavesdropper or a rogue application cannot determine the passwords by simply examining the data within the password store. Note that a computer system typically does not decrypt a password during an authentication operation, but instead encrypts the password supplied by the user and then compares the newly encrypted password with an encrypted password retrieved from the password store.

As computer systems grow increasingly more powerful, existing password encryption techniques are becoming vulnerable brute force decryption techniques. For example, assuming that a password contains only characters from a subset of characters that most people use, it is possible to crack the commonly used Data Encryption Standard (DES) encryption technique in a day or two using computing resources that are available to the average undergraduate.

Because of this increased vulnerability, some system administrators would like to use stronger encryption techniques to encrypt passwords. However, it is presently not possible to modify existing systems to use a different password encryption technique without modifying source code for the operating system or application. Unfortunately, in many cases only the executable files for an operating system or application are provided, and this source code is not available.

Moreover, even if the source code can be modified for a specific computer system to produce modified executable code, the modified executable code cannot be updated using patches that are distributed to fix bugs in the original unmodified executable code.

Hence, what is needed is a method and an apparatus that allows a password encryption technique to be modified without having to modify source code.

SUMMARY

One embodiment of the present invention provides a system that implements a pluggable password obscuring mechanism. During operation, the system receives a request to obscure a password to produce an obscured version of the password. If the request specifies a customized technique for obscuring the password, the system loads a dynamic library that performs the customized technique, and then uses the dynamic library to obscure the password. If the request does not specify a customized technique, the system uses a default technique to obscure the password. In this way, the customized technique for obscuring the password can be used without having to modify source code.

In a variation on this embodiment, loading the dynamic library involves looking up the customized technique in a configuration file. If the configuration file contains a valid entry for the customized technique, the system loads the dynamic library. Otherwise, if the configuration file does not contain a valid entry for the customized technique, the system uses the default technique to obscure the password.

In a variation on this embodiment, if the request to obscure the password is associated with a change of password operation, the system ensures that the customized technique is consistent with a system policy. Otherwise, if the customized technique is not consistent with the system policy, the system uses the default technique to obscure the password.

In a variation on this embodiment, the request to obscure the password includes a salt, which is an item of data associated with the password. The system uses the salt as an additional input to a function that obscures the password.

In a variation on this embodiment, the system receives a request to generate the salt. In response to this request, the system determines if the request specifies a customized technique for generating the salt. If so, the system loads a dynamic library that performs the customized technique for generating the salt, and then uses the dynamic library to generate the salt. If the request does not specify a customized technique, the system uses a default technique to generate the salt.

In a further variation, if the request specifies a customized technique for generating the salt, the system ensures that the customized technique is consistent with a system policy. Otherwise, if the customized technique is not consistent with the system policy, the system uses the default technique to generate the salt.

In a variation on this embodiment, the dynamic library is stored in a shared object.

In a variation on this embodiment, the request to obscure the password can be associated with: a password initialization operation, a password change operation; or a password verification operation.

Table 1 illustrates an exemplary configuration file in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Operating System

Figure 1:
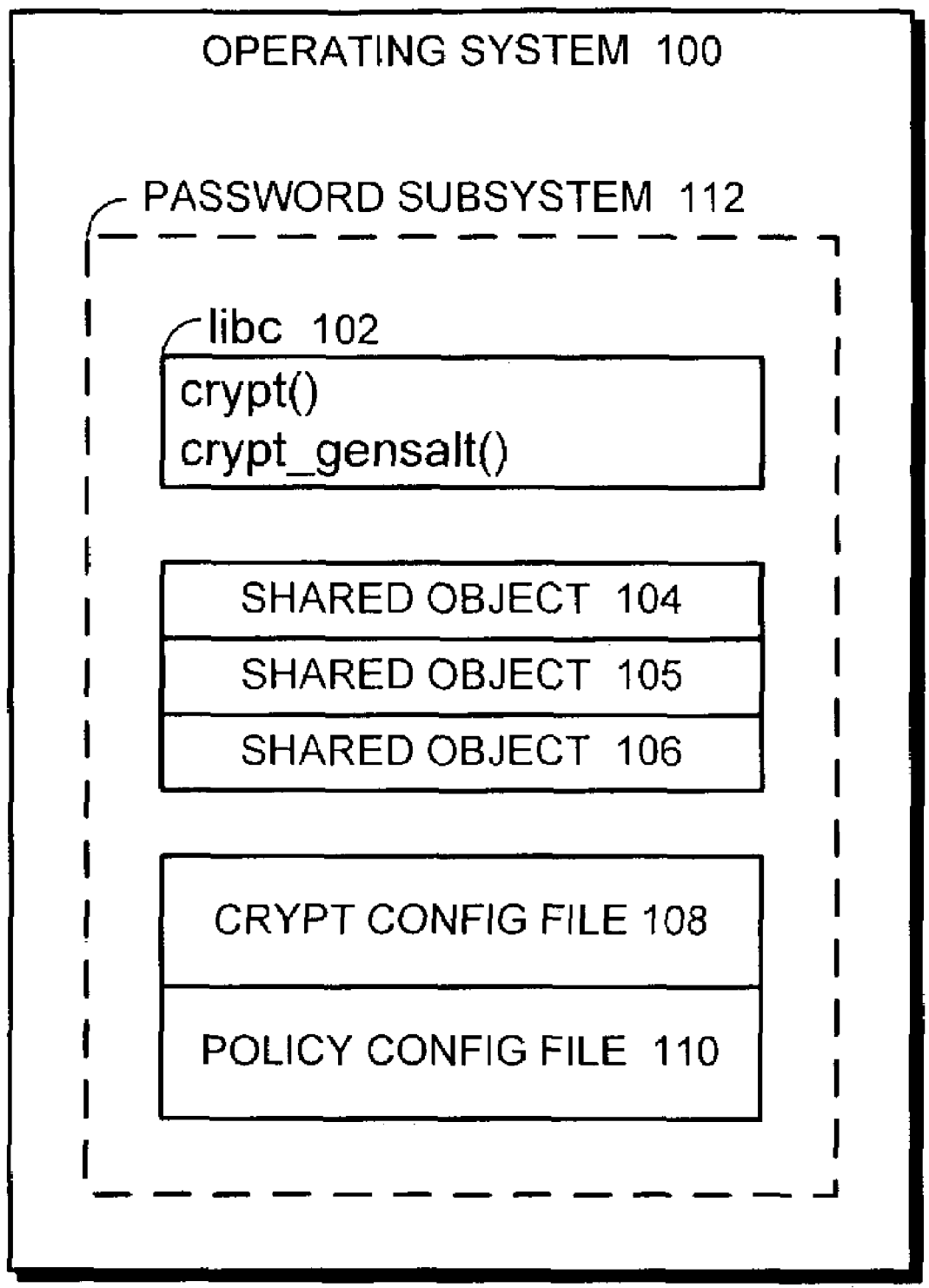
FIG. 1 illustrates an operating system in accordance with an embodiment of the present invention.

FIG. 1 illustrates an operating system 100 in accordance with an embodiment of the present invention. Operating system 100 can operate within any type of computer system, including, but not limited to, a computer system based on a microprocessor, a mainframe computer, a digital signal processor, a portable computing device, a personal organizer, a device controller, and a computational engine within an appliance.

Operating system 100 includes a password subsystem 112, which facilitates using passwords to restrict access to accounts maintained by operating system 100. Note that the present invention can also facilitate using passwords to restrict access to applications.

Password subsystem 112 includes a number of items, including two functions "crypt()" and "crypt_gensalt()," which are located within library "libc" 102. The function crypt() takes in a password and a salt and uses these two inputs to produce an encrypted (obscured) password. The function "crypt_gensalt()" generates a salt, which contains either a random number or miscellaneous data associated with the user that is used to perturb the password obscuring function performed by crypt().

Password subsystem 112 also includes a number of shared objects 104-106, which contain alterative implementations of crypt() and crypt_gensalt().

Password subsystem 112 uses of a crypt configuration file 108, which specifies allowed password encryption and salt generation techniques. Crypt configuration file 108 also specifies the locations of shared objects containing code to implement the techniques. An example crypt configuration file appears in Table 1 below.

| <technique ID> | <shared object> |
|---|---|
| 1 | crypt.bsdmd5.so |
| 2 | crypt.bsdbf.so |
| ... | ... |
| govt | crypt.govt.so |

Note that each entry in this exemplary configuration file contains an identifier for an encryption technique and a corresponding identifier for a shared object containing code that implements the encryption technique.

Password subsystem 112 also uses a policy configuration file 110, which specifies policies to be applied during the password encryption process. For example, policy configuration file 110 can include a list of allowed techniques or a list of denied techniques. Policy configuration file 110 can also specify a default technique.

Configuring System for Customized Technique

Figure 2:
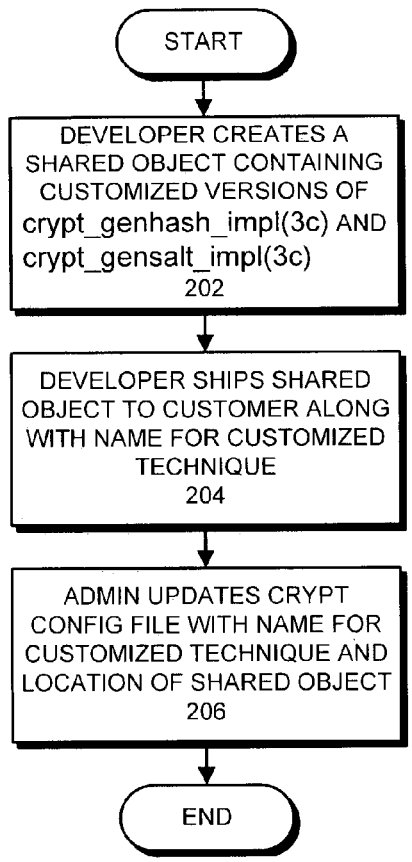
FIG. 2 is a flow chart illustrating the process of configuring a system to use a customized technique for obscuring passwords accordance with an embodiment of the present invention.

FIG. 2 is a flow chart illustrating the process of configuring a system to use a customized technique for obscuring passwords accordance with an embodiment of the present invention. The process starts when a developer creates a shared object containing customized versions of crypt_genhash_impl() and crypt_gensalt_impl() (step 202). The function crypt_genhash_impl() implements a customized hashing technique for obscuring a password, whereas the function crypt_gensalt_impl() implements a customized salt generation technique.

Next, the developer ships the shared object to a customer (or other user) along with a name for the customized technique (step 204). At the customer site, a system administrator updates crypt configuration file 108 to include an entry for the new object (step 206). At this point, the customized technique is ready to be used.

Process of Obscuring Password

Figure 3:
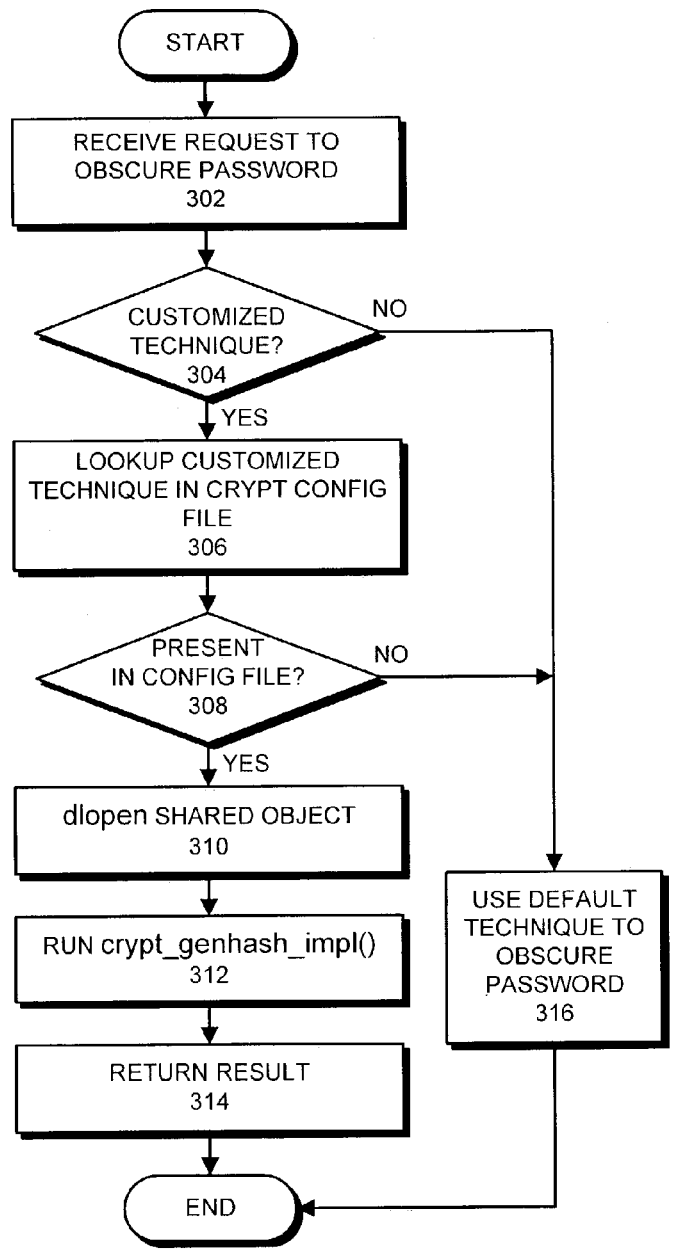
FIG. 3 is a flow chart illustrating the process of obscuring a password in accordance with an embodiment of the present invention.

FIG. 3 is a flow chart illustrating the process of obscuring a password in accordance with an embodiment of the present invention. This obscuring operation can take place in a number of contexts. For example, the password obscuring operation can take place during a password initialization operation, a password change operation or a password verification operation as is discussed below with reference to FIG. 5.

The system first receives a request to obscure a password (step 302). For example, the system can receive a call to the function crypt(), wherein the function call includes an input string containing the password and an input string containing a salt to be used in obscuring the password.

Next, the system determines whether the function call specifies a customized technique (step 304). In one embodiment of the present invention, this involves examining the first character of the salt. If the first character is a "$," a customized technique is specified by a subsequent character string.

If a customized technique is specified, the system looks up the customized technique specified by the subsequent character string in crypt configuration file 108 (step 306). The system then determines whether crypt configuration file 108 contains an entry for the technique (step 308). If so, the system loads a dynamic library containing code to obscure the password. In one embodiment of the present invention, this involves opening the shared object specified by the entry in crypt configuration file 108 by performing a "dlopen()" command on the shared object (step 310). Next, the system executes the function crypt_genhash_impl() from the shared object to obscure the password (step 312). The system then returns the result (step 314).

If the initial request to obscure the password did not specify a customized technique at step 304, or if a valid entry for the customized technique was not present in crypt configuration file 108 at step 308, then the system reverts to a default technique to obscure the password (step 316) before returning the result (step 314).

Process of Generating Salt

Figure 4:
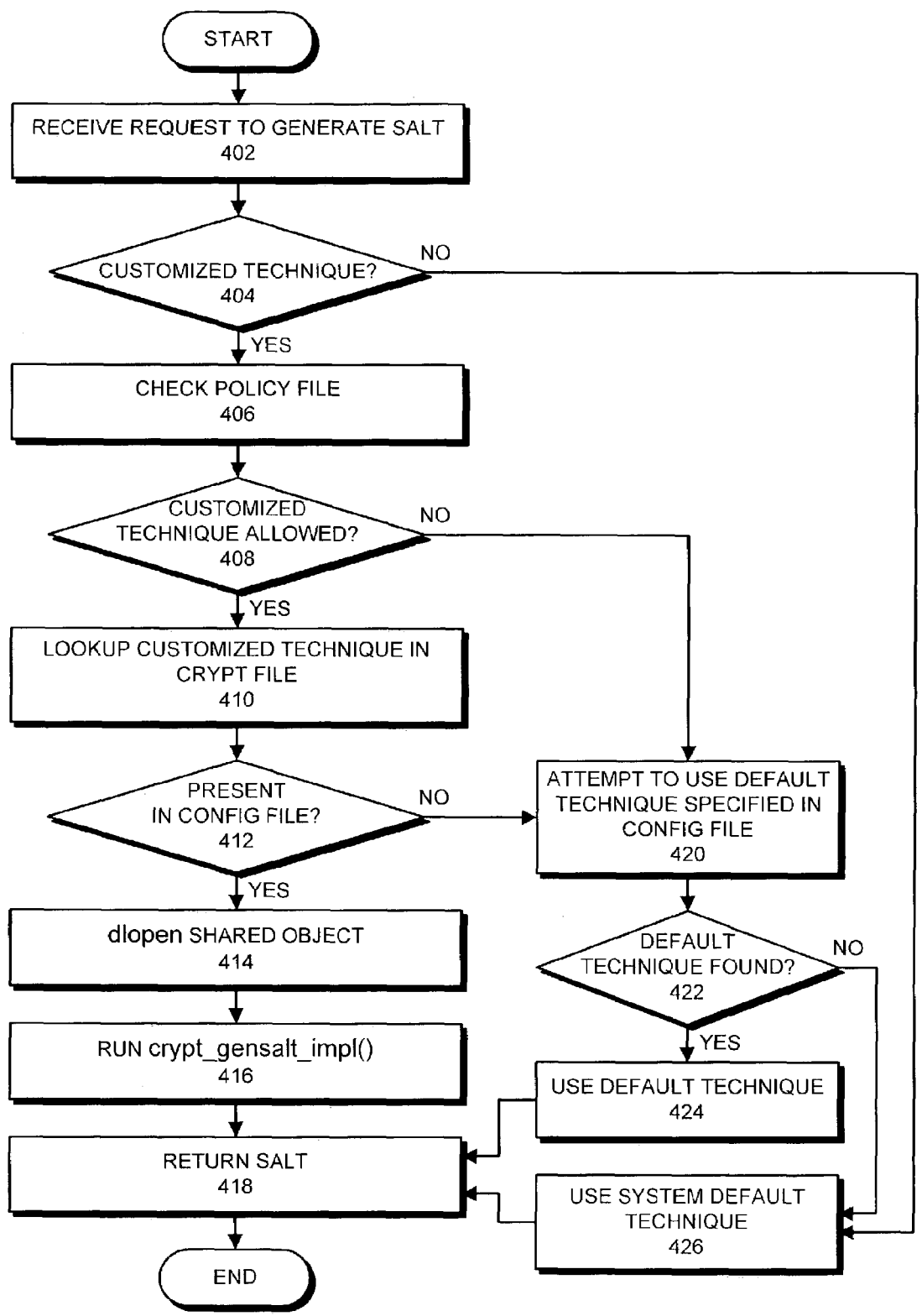
FIG. 4 is a flow chart illustrating the process of generating a salt in accordance with an embodiment of the present invention.

FIG. 4 is a flow chart illustrating the process of generating a salt in accordance with an embodiment of the present invention. The system first receives a request to generate a salt (step 402). For example, the system can receive a call to the function crypt_gensalt().

Next, the system determines whether the function call specifies a customized technique (step 404). In one embodiment of the present invention, this involves examining the first character of an input string to the function crypt_gensalt(). If the first character is a "$," then a customized technique is specified by a subsequent character string.

If a customized technique is specified, the system looks up the customized technique specified by the subsequent character string in policy configuration file 110 illustrated in FIG. 1 (step 406). Next, the system determines if the customized technique is allowed by policy configuration file 110 (step 408).

If so, the system looks up the customized technique in crypt configuration file 108 (step 410). The system then determines whether crypt configuration file 108 contains an entry for the customized technique (step 412). If so, the system loads a dynamic library containing code to obscure the password. In one embodiment of the present invention, this involves performing a dlopen() command to open the shared object specified by the entry in crypt configuration file 108 (step 414). Next, the system executes the function crypt_gensalt_impl() from the shared object to generate the salt (step 416).

If the function call does not specify a default technique in step 404, the system generates the salt using a system default technique (step 426).

If the customized technique is not allowed by policy configuration file 110 at step 408 or if the customized technique is not present in crypt configuration file 108 at step 412, the system attempts to use the default technique specified in policy configuration file 110 (step 420). (Note that this may involve looking up the default technique in crypt configuration file 108 and possibly loading a shared object for the default technique.)

If the default technique is found, the system uses the default technique to generate the salt (step 424). Otherwise, the system uses the system default technique to generate the salt (step 426).

Finally, the system returns the salt to the calling program (step 418).

Process of Changing Password

Figure 5:
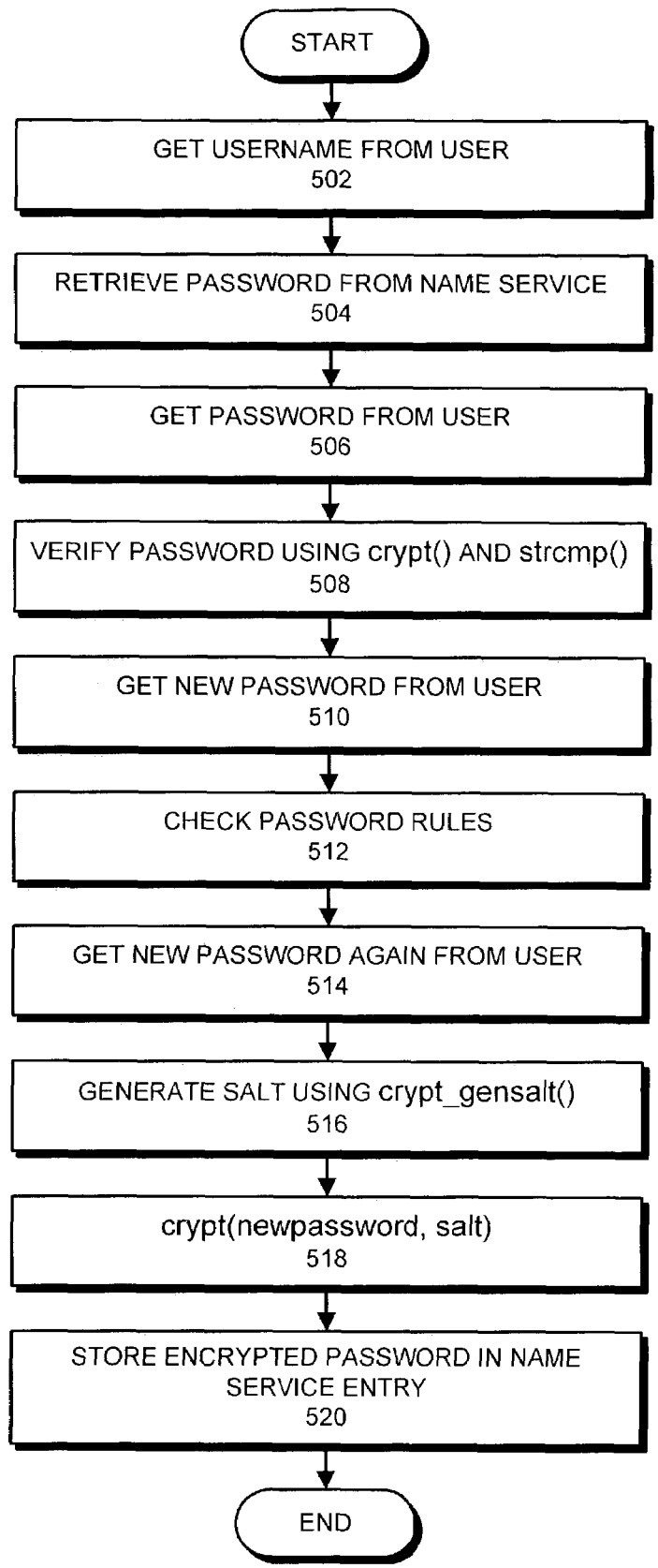
FIG. 5 is a flow chart illustrating the process of changing a password in accordance with an embodiment of the present invention.

FIG. 5 is a flow chart illustrating the process of changing a password in accordance with an embodiment of the present invention. The system starts by obtaining a username from a user (step 502). The system then retrieves an obscured password associated with the username from a password store, such as a name service (step 504). Next, the system gets a password from the user (step 506).

The system verifies the password is correct by using crypt() to produce an obscured password and then using a string compare function "strcmp()" to compare the newly generated obscured password with the obscured password retrieved from the name service (step 508).

Next, the system gets the new password from the user (step 510) and checks a set of password rules to ensure that the new password complies with the rules (step 512). If not, the system can ask for another new password.

The system then asks for the new password again to ensure that it was typed in properly the first time (step 514).

Next, the system generates a salt by calling crypt_gensalt() (step 516). The system then obscures the password by calling the function crypt() with the new password and the salt as input parameters (step 518). The system then stores the obscured password generated by the function crypt in an entry in the password store associated with the username (step 520).

Note that the process of verifying a password can be accomplished by performing only steps 502, 504, 506 and 508 of the flow chart illustrated in FIG. 5.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for implementing a pluggable password obscuring mechanism, comprising:

receiving a request to obscure a password to produce an obscured version of the password, wherein the request to obscure the password includes a salt, which is an item of data associated with the password;

if the request to obscure the password specifies a customized technique from a plurality of customized techniques for obscuring the password, wherein obscuring the password involves using the salt as an additional input to a function that obscures the password, loading a dynamic library that performs the customized technique, and using the dynamic library to obscure the password;

if the request to obscure the password does not specify a customized technique for obscuring the password, using a default technique to obscure the password;

receiving a request to generate the salt;

in response to the request to generate the salt, determining if the request specifies a customized technique for generating the salt;

if the request specifies a customized technique for generating the salt, loading a dynamic library that performs the customized technique for generating the salt, and using the dynamic library to generate the salt;

if the request does not specify a customized technique for generating the salt, using a default technique to generate the salt; and storing the obscured password in a password store;

whereby the customized technique for obscuring the password can be used without having to modify source code to include the customized technique.

2. The method of claim 1, wherein loading the dynamic library involves:

looking up the customized technique in a configuration file;

if the configuration file contains a valid entry for the customized technique, loading the dynamic library; and if the configuration file does not contain a valid entry for the customized technique, using the default technique to obscure the password.

3. The method of claim 1, wherein if the request to obscure the password is associated with a change of password operation, the method additionally involves ensuring that the customized technique is consistent with a system policy.

4. The method of claim 3, wherein if the customized technique is not consistent with the system policy, the method further involves using the default technique to obscure the password.

5. The method of claim 1, wherein if the request specifies a customized technique for generating the salt, the method additionally involves ensuring that the customized technique is consistent with a system policy.

6. The method of claim 5, wherein if the customized technique is not consistent with the system policy, the method additionally involves using the default technique to generate the salt.

7. The method of claim 1, wherein the dynamic library is stored in a shared object.

8. The method of claim 1, wherein the request to obscure the password is associated with one of:
   a password initialization operation;
   a password change operation; and
   a password verification operation.

9. A computer-readable storage medium storing instructions that when executed by a computer cause the computer to perform a method for implementing a pluggable password obscuring mechanism, the method comprising:
   receiving a request to obscure a password to produce an obscured version of the password, wherein the request to obscure the password includes a salt, which is an item of data associated with the password;
   if the request to obscure the password specifies a customized technique from a plurality of customized techniques for obscuring the password, wherein obscuring the password involves using the salt as an additional input to a function that obscures the password,
      loading a dynamic library that performs the customized technique, and
      using the dynamic library to obscure the password;
   if the request to obscure the password does not specify a customized technique for obscuring the password, using a default technique to obscure the password;
   receiving a request to generate the salt;
   in response to the request to generate the salt, determining if the request specifies a customized technique for generating the salt;
   if the request specifies a customized technique for generating the salt,
      loading a dynamic library that performs the customized technique for generating the salt, and
      using the dynamic library to generate the salt:
   if the request does not specify a customized technique for generating the salt, using a default technique to generate the salt; and
   storing the obscured password in a password store;
   whereby the customized technique for obscuring the password can be used without having to modify source code to include the customized technique.

10. The computer-readable storage medium of claim 9, wherein loading the dynamic library involves:
    looking up the customized technique in a configuration file;
    if the configuration file contains a valid entry for the customized technique, loading the dynamic library; and
    if the configuration file does not contain a valid entry for the customized technique, using the default technique to obscure the password.

11. The computer-readable storage medium of claim 9, wherein if the request to obscure the password is associated with a change of password operation, the method additionally involves ensuring that the customized technique is consistent with a system policy.

12. The computer-readable storage medium of claim 11, wherein if the customized technique is not consistent with the system policy, the method further involves using the default technique to obscure the password.

13. The computer-readable storage medium of claim 9, wherein if the request specifies a customized technique for generating the salt, the method additionally involves ensuring that the customized technique is consistent with a system policy.

14. The computer-readable storage medium of claim 13, wherein if the customized technique is not consistent with the system policy, the method additionally involves using the default technique to generate the salt.

15. The computer-readable storage medium of claim 9, wherein the dynamic library is stored in a shared object.

16. The computer-readable storage medium of claim 9, wherein the request to obscure the password is associated with one of:
    a password initialization operation;
    a password change operation; and
    a password verification operation.

17. An apparatus that provides a pluggable password obscuring mechanism, comprising:
    a receiving mechanism that is configured to receive a request to obscure a password to produce an obscured version of the password, wherein the request to obscure the password includes a salt, which is an item of data associated with the password;
    an obscuring mechanism that is configured to obscure the passwords wherein obscuring the password involves using the salt as an additional input to a function that obscures the password;
    a customization mechanism, wherein if the request to obscure the password specifies a customized technique from a plurality of customized techniques for obscuring the password, the customization mechanism is configured to load a dynamic library that performs the customized technique;
    wherein if the request to obscure the password does not specify a customized technique for obscuring the password, the obscuring mechanism is configured to use a default technique to obscure the password;
    a salt generation mechanism;
    wherein upon receiving a request to generate the salt, the salt generation mechanism is configured to determine if the request specifies a customized technique for generating the salt;
    wherein if the request to generate the salt specifies a customized technique for generating the salt, the salt generation mechanism is configured to,
       load a dynamic library that performs the customized technique for generating the salt, and to
       use the dynamic library to generate the salt; and
    wherein if the request to generate the salt does not specify a customized technique for generating the salt, the salt generation mechanism is configured to use a default technique to generate the salt; and
    a storing mechanism that is configured to store the obscured password in a password store;
    whereby the customized technique for obscuring the password can be used without having to modify source code to include the customized technique.

18. The apparatus of claim 17,
    wherein if the request specifies a customized technique for obscuring the password, the customization mechanism is configured to look up the customized technique in a configuration file;
    wherein if the configuration file contains a valid entry for the customized technique, the customization mechanism is configured to load the dynamic library; and wherein if the configuration file does not contain a valid entry for the customized technique, the obscuring mechanism is configured to use the default technique to obscure the password.

19. The apparatus of claim 17, wherein if the request to obscure the password is associated with a change of password operation, the customization mechanism is configured to ensure that the customized technique is consistent with a system policy.

20. The apparatus of claim 19, wherein if the customized technique is not consistent with the system policy, the customization mechanism is configured to use the default technique to obscure the password.

21. The apparatus of claim 17, wherein if the request specifies a customized technique for generating the salt, the salt generation mechanism is configured to ensure that the customized technique is consistent with a system policy.

22. The apparatus of claim 21, wherein if the customized technique is not consistent with the system policy, the salt generation mechanism is configured to use the default technique to generate the salt.

23. The apparatus of claim 17, wherein the dynamic library is stored in a shared object.

24. The apparatus of claim 17, wherein the request to obscure the password is associated with one of:
 a password initialization operation;
 a password change operation; and
 a password verification operation.

* * * * *